United States Patent [19]
Dick et al.

[11] Patent Number: 5,294,136
[45] Date of Patent: Mar. 15, 1994

[54] ONE PERSON FURNITURE OR APPLIANCE MOVER

[76] Inventors: Jerry E. Dick; Susan J. Dick, both of 42 Ellesboro Drive, Mississauga, Ontario, Canada, L4N 1C2

[21] Appl. No.: 762,347

[22] Filed: Sep. 19, 1991

[30] Foreign Application Priority Data

Sep. 25, 1990 [CA] Canada ............................. 2026101

[51] Int. Cl.⁵ .............................................. B62B 5/02
[52] U.S. Cl. ...................................... 280/5.2; 180/7.5; 254/323
[58] Field of Search ................ 280/5.2, 5.24, 5.22, 280/5.28, 5.3, 5.32, 32; 180/7.5; 414/490; 254/323

[56] References Cited

U.S. PATENT DOCUMENTS

| | | | |
|---|---|---|---|
| 2,834,602 | 5/1958 | Hanson | 280/5.3 |
| 3,893,679 | 7/1975 | Sumrall | 280/5.3 |
| 4,052,080 | 10/1977 | Hedderich et al. | 414/490 X |
| 4,754,825 | 7/1988 | Scheffer | 180/7.5 |
| 4,892,323 | 1/1990 | Oxford | 180/7.5 X |

Primary Examiner—Margaret A. Focarino
Assistant Examiner—Florian Zeender

[57] ABSTRACT

A portable furniture and appliance mover includes a frame which has a handle on the rearward portion and a lateral load-engaging member on the forward portion. A forward projecting member engages the load longitudinally and permits application of a moment on the load about a lateral axis that is both perpendicular to the direction of motion and parallel to the incline on which the load is moved. An operable winch is mounted on a medial lateral member of the frame. The winch cable is played off of the winch and is trained around a pulley which is removably secured below the center of gravity of the load. The free end of the cable is then removably attached to a fixed point at or beyond the top of the incline.

2 Claims, 3 Drawing Sheets

ONE PERSON FURNITURE OR APPLIANCE MOVER

BACKGROUND OF THE INVENTION

The present invention relates to a Simple, portable, one person load mover and more specifically to a load mover which permits a single person to move loads such as heavy furniture or appliances up and down inclines.

The transport of heavy household furniture or appliances up and down inclines is normally accomplished by two or more persons who simply pick up and carry the load in question. The size and the nature of such items, the frequent complexity of inclines, and the fact that persons attempting to move such loads are often inexperienced at such work has resulted in numerous injuries (hernias, back injuries, crushed toes, etc.) and much damage (gouged walls and stairwells and damaged appliances or furniture). Organizations or firms with personnel experienced in currying such loads must usually commit two or more people to this task, thus incurring greater expense than if one person were able to accomplish it alone. The advantages of the device for which the patent is sought are that it is cheap to manufacture and simple to use, and that it will reduce the cost and potential for damage and injury associated with this task.

The most obvious way to use a means with mechanical advantage (or force magnification) to draw in a flexible line and thereby pull a load up an incline would be to fasten a winching device at the top of the incline, attach the free end of the flexible line to the load and commence winching.

A major problem with this approach is that the location of the winching device at the top of the incline interferes with movement of the load onto the upper landing. The flexible line cannot be disconnected unless the operator can pull the load up the remaining portion of the incline manually and lift it over the device.

A second problem is the fact that the flexible line used to draw the load may slide over the surfaces of the incline and gouge or otherwise damage any areas which it contacts.

In a situation where loads are repeatedly moved up or down a specific incline, it might be possible to bolt, clamp or otherwise attach a winching device to an appropriate point above and behind the landing and thereby obviate the aforesaid problems. However, such an approach would be application-specific and would not be suitable for general use.

Accordingly, it is an object of the present invention that it be versatile enough to be applied on any kind of incline, including a flight of stairs, a ladder, or a vehicle loading ramp.

Another object of the present invention is that it can continue application of the motive force until the center of gravity of the load is above the elevation of the top of the incline. The load can then be rotated to dispose the center of gravity of the load over the horizontal surface at the top of the incline so that the flexible line can be disconnected from the fixed point and the invention disengaged from the load.

Another object of the invention is that the motive force can be applied in a continuous (as opposed to stepwise) manner resulting in smooth and expeditious load traversal.

A further object of the invention is that the flexible line by which the device applies its motive force may contact but will not slide over any portion of the incline or upper landings or floors on which the load moves.

Still another object of the invention is that it is portable for a person of average strength and can be easily curried and employed in a variety of locations to move many kinds of loads.

These and other objects and advantages of the invention will be readily apparent to one familiar with the difficulties of moving heavy furniture and and appliances and particularly upon reading the following detailed description and inspecting the accompanying drawings.

SUMMARY OF THE INVENTION

Briefly described, the one person furniture and appliance mover of the present invention includes a frame comprised of two elongated generally parallel members with forward and rearward ends. A lateral member at the rearward end of the frame is a handle. A lateral member and a longitudinal forward-projecting member are both attached near the forward end of the frame and engage the load to be moved.

A medial lateral member is attached to the frame between the forward and rearward ends. A winch is attached to the medial lateral member and contains a spool with a flexible line wound thereon.

The flexible line is played off the spool and and trained around a pulley which is removably secured to the load at a point below the center of gravity of the load. The free end of the cable is removably secured to a fixed point above the top of the incline.

BRIEF DESCRIPTION OF THE DRAWINGS

The invention, as exemplified by a preferred embodiment, is described with reference to the drawings in which.

DETAILED DESCRIPTION OF THE PREFERRED EMBODIMENT

Figure 1:
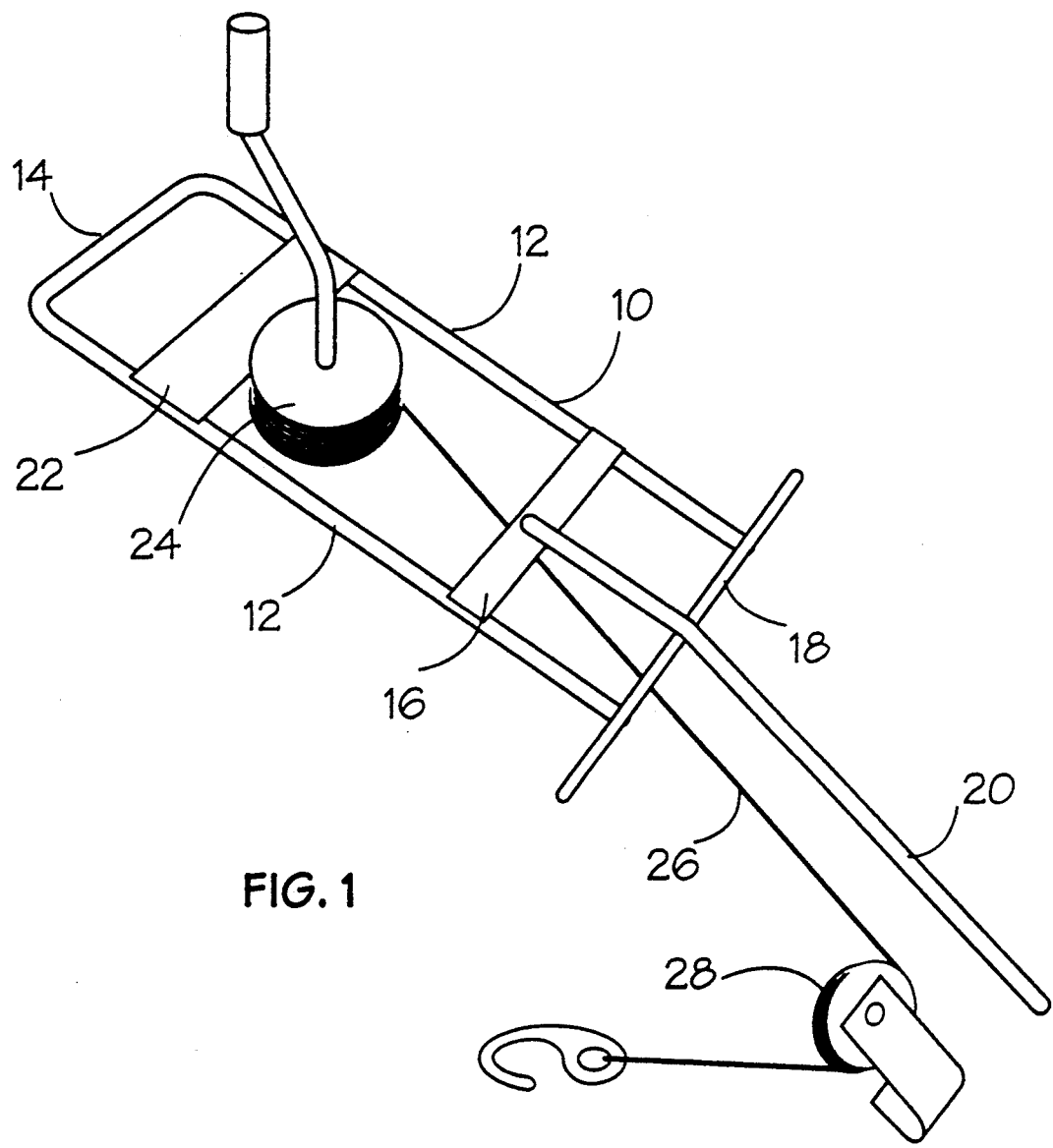
FIG. 1 is a perspective view of the preferred embodiment of the invention.

With reference to the drawings wherein identical or corresponding parts are identified by the same reference numeral, FIG. 1 shows a furniture or appliance mover at 10, which includes a frame with two generally parallel longitudinal members 12, a rearward lateral member 14 which is used as a handle structure, and a forward lateral member 16.

A laterally extending member 18 is attached to the generally forward parts of the longitudinal frame members 12 and engages the load to be moved in a plane which is generally perpendicular to the direction of load traversal.

A forwardly projecting longitudinal member 20 is attached to lateral members 16 and 18 in the embodiment illustrated and engages the load generally longitudinally permitting the user to impose a moment on the load about a lateral axis which is substantially perpendicular to the direction of load traversal and parallel to the plane of the surface over which the load is moved.

The user is thus able to lift and direct the end of the load engaged by the device by manipulating the handle structure 14.

The lateral load engagement member 18 and the longitudinal load engagement member 20 are suitable for engagement and removable securement on the geometries of most furniture, appliances, or the platforms or structures on which such loads are typically moved.

A medial lateral member 22 is attached to the frame members 12. A winch with a spool 24 having a length of flexible line 26 wound thereon is mounted on the medial lateral member 22. The flexible line 26 is trained around a pulley 28 and the free end of the flexible line 26 is then removably secured to a fixed point above the top of the incline.

The pulley 28 is removably secured to the load at a point which is below the center of gravity of the load for all possible orientations of the load during load traversal. Thus motive force can be applied until the center of gravity of the load is above the elevation of the top of the incline. The load can then be rotated in a plane perpendicular to the direction of motion and to the plane of the incline so that the center of gravity of the load is disposed over the horizontal surface at the top of the incline. The flexible line can then be slackened and the invention disengaged from the load.

Figure 2:
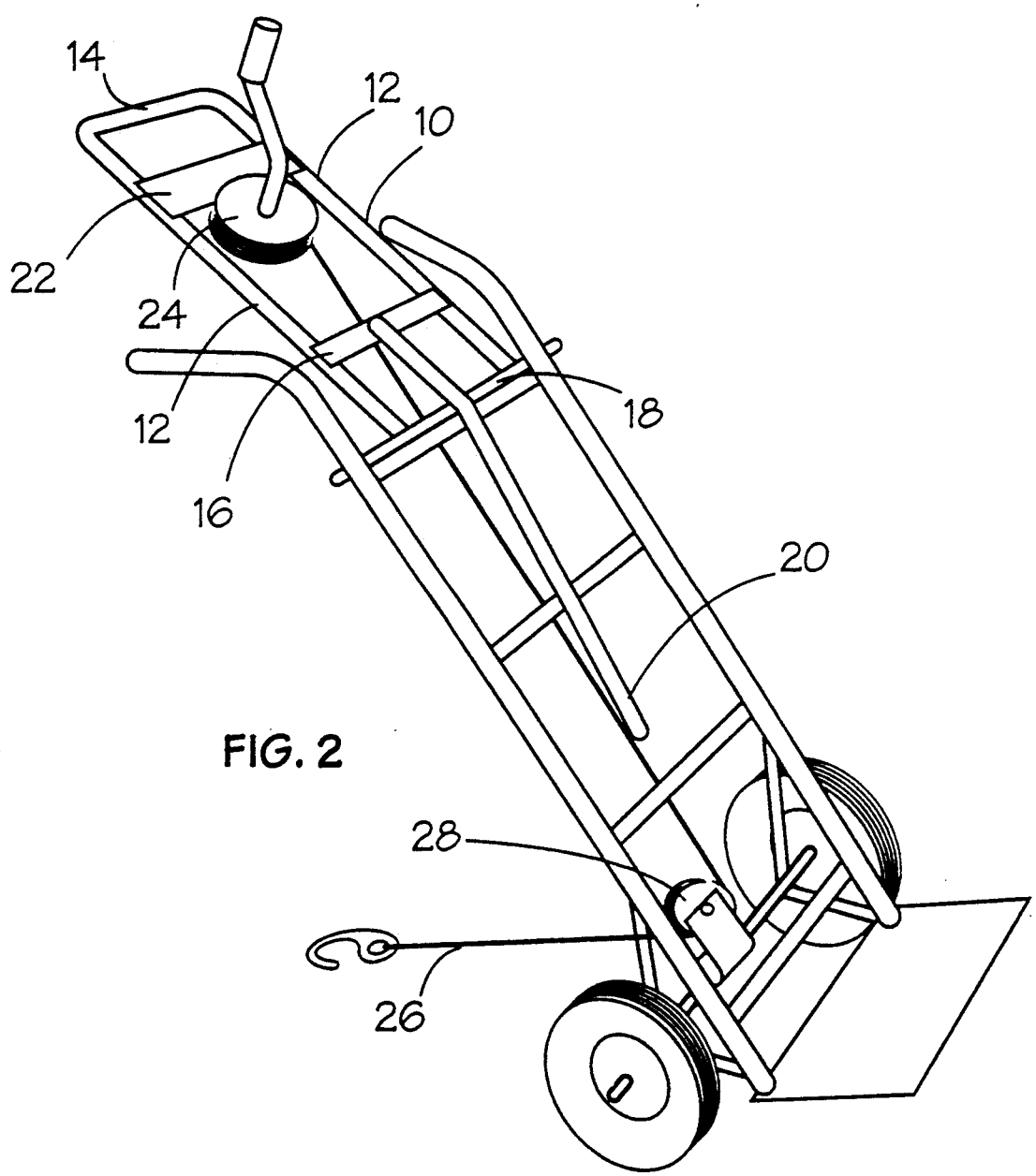
FIG. 2 is a perspective view of the embodiment of FIG. 1 showing engagement on a typical hand truck.

Referring now to FIG. 2, the invention 10 is engaged on a typical hand truck by preferably positioning the laterally extending member 18 beneath the handles. The forwardly projecting longitudinal member 20 is preferably positioned on the hand truck bed. The load to be moved is then placed on the hand truck bed and removably secured. The hand truck with load can thus be manipulated by grasping the handle structure 14 of the invention preferably with one hand.

The pulley 28 is removably secured to the axle or the nose of the hand truck and the free end of the flexible line 26 is removably secured at a fixed point which is beyond the upper end of the incline. As the flexible line 26 does not move relative to fixed surroundings, it may follow any tortuous path to the fixed point.

Figure 3:
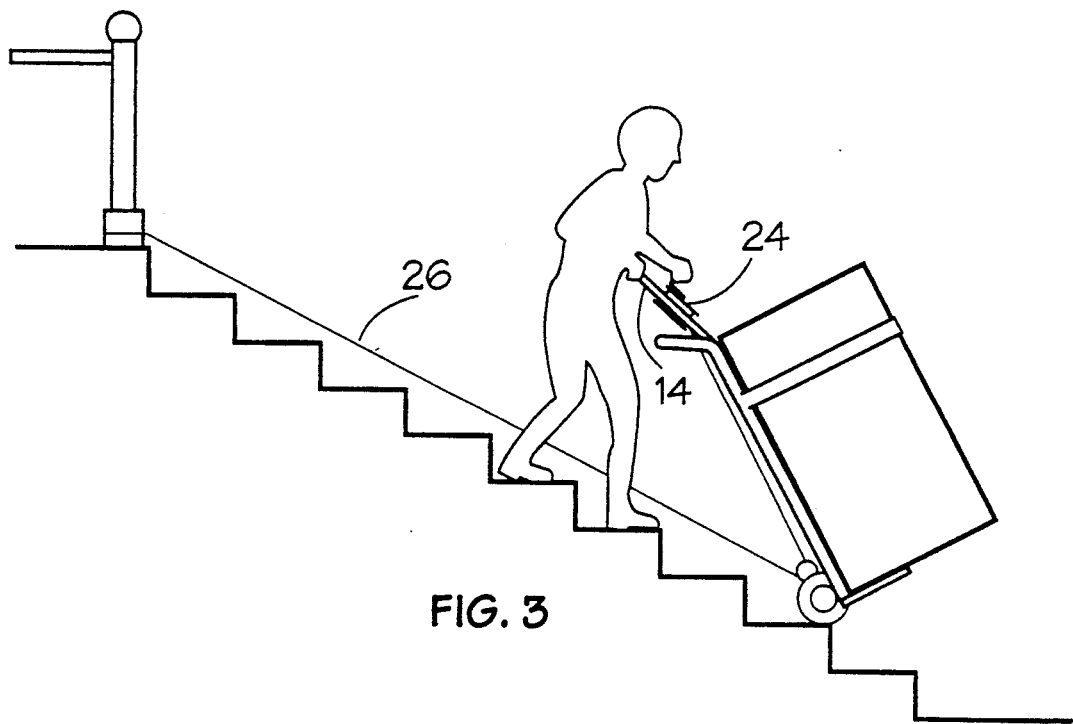
FIG. 3 is a side view of the embodiment of FIG. 1 showing engagement on a loaded hand truck and the position of the user when ascending or descending a flight of stairs.

Referring now to FIG. 3, the handle structure 14 is drawn upward with one band to raise one end of the load. The L-shaped crank on the winch 24 is then operated with the other hand to draw in or release the flexible line 26.

The application of motive force is continued at the top of the incline even if the orientation of the load must change from an inclined position on the incline to a horizontal position on the landing or horizontal surface at the top of the incline. The same is true for the reverse situation if the orientation of the load changes from a horizontal position at the top of the incline to a position parallel with the incline. Therefore, throughout the process, there is no need for the operator of the device to effect any unaided vertical component of load traversal.

The aforesaid feature is also possible if the device is engaged at the lower end of the load. In this mode of application, the flexible line is not passed around the removably secured pulley and the free end of the cable is simply attached to the fixed point.

All of the components of the device including the frame can be fabricated from a variety of materials including plastics, metals such as aluminum and steel, and wood.

Although only a single embodiment of the present invention has been described and illustrated, the present invention is not limited to the features of this embodiment, but includes all variations and modifications within the scope of the claims.

The embodiments of the invention in which an exclusive property or priviledge is claimed are defined as follows:

1. A portable furniture or appliance mover comprising:
    a frame means having rearward and forward ends;
    a handle means at the rearward end of said frame means;
    a laterally extending member positioned forwardly on said frame means to provide a means for lateral engagement with a load;
    a medial lateral member fastened to said frame means;
    a winch means operatively secured on said medial lateral member, including a flexible line member wound thereon for extension therefrom;
    a pulley means removably secured below the center of gravity of the load so that the flexible line member from said winch means trained around said pulley means can be used to apply motive force to the load until the center of gravity of the load is disposed above a horizontal surface at the top of an incline.

2. The furniture and appliance mover of claim 1 wherein a forwardly projecting longitudinal member is mounted at the forward end of said frame means and projects beyond a perimeter of said frame means to provide a means for longitudinal load engagement.

* * * * *